United States Patent
Tupaj et al.

[11] 3,718,777
[45] Feb. 27, 1973

[54] MAGNETIC TAPE RECORDER HAVING A FRICTION WHEEL DRIVE FOR THE TAPE REEL CARRIER SHAFTS

[75] Inventors: Manfred Paul Tupaj, 8031 Grobenzell; Heinz Engert, 8 Munich, both of Germany

[73] Assignee: Sud Atlas Werke G.m.b.H., Munich, Germany

[22] Filed: Jan. 15, 1971

[21] Appl. No.: 106,780

[30] Foreign Application Priority Data

Jan. 24, 1970 Germany.....................P 20 03 154.3

[52] U.S. Cl...............179/100.2 R, 242/200, 274/4 D
[51] Int. Cl..........................G11b 15/02, G11b 15/28
[58] Field of Search............179/100.2 R, 100.2 MD; 274/4 A, 11 A; 226/42, 44; 242/192, 200, 187, 201

[56] References Cited

UNITED STATES PATENTS

| | | |
|---|---|---|
| 3,429,579 | 2/1969 | Hoag............................179/100.2 R |
| 3,531,575 | 9/1970 | Kobler et al................179/100.2 MD |
| 3,373,951 | 3/1968 | Mazoyer..............................242/200 |
| 3,285,525 | 11/1966 | Buckler..............................242/187 |
| 3,571,524 | 3/1971 | Kozu....................................35/35 C |

*Primary Examiner*—Bernard Konick
*Assistant Examiner*—Alfred H. Eddleman
*Attorney*—McGlew & Tuttle

[57] ABSTRACT

A pair of friction wheels are combined with a belt pulley to form a flywheel driven from a motor output shaft by resilient power transmission means. The friction wheels and the belt pulleys are rotatably mounted on a setting lever pivoted about the rewind carrier shaft and operated by an angularly displaceable cam in turn operated by a slide whose movement is effected by rotation of a switching or setting wheel. In the forward setting, a smaller diameter friction wheel engages a counterwheel secured to the feeding carrier shaft and, in another position, a larger diameter friction wheel engages an intermediate wheel in turn engaged with a counterwheel secured to the rewind carrier shaft. The levers cooperable with the angularly displaceable cam control the switches for recording and playback, as well as a switch controlling energization of the driving motor.

3 Claims, 6 Drawing Figures

INVENTOR:
Heinz ENGERT

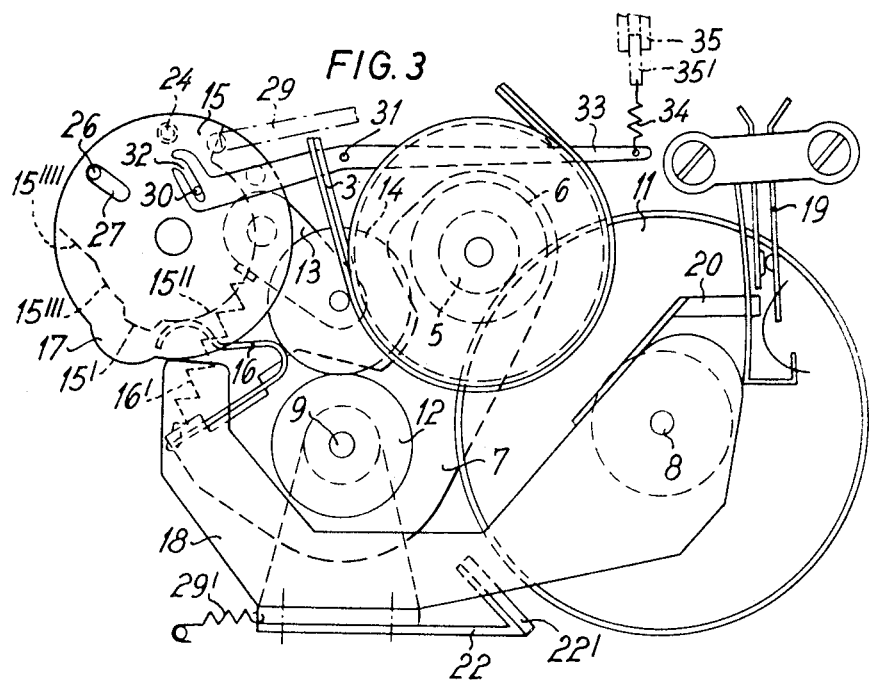
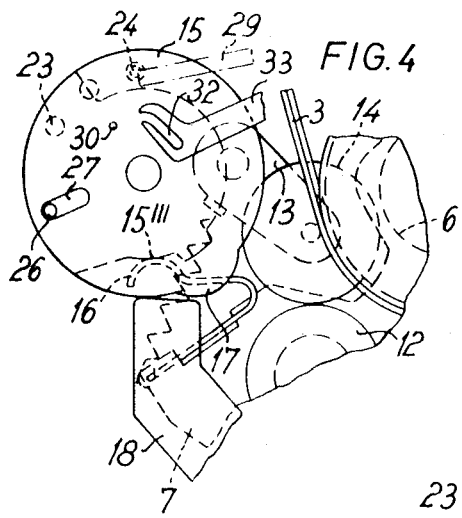
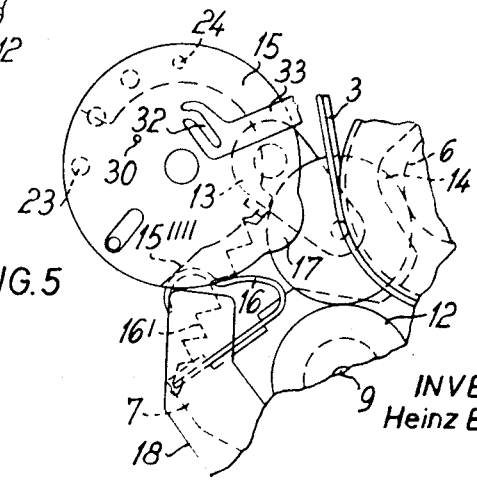
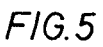

MAGNETIC TAPE RECORDER HAVING A FRICTION WHEEL DRIVE FOR THE TAPE REEL CARRIER SHAFTS

BACKGROUND OF THE INVENTION

In certain known magnetic tape recorders having friction wheel drives, stepped friction wheels have a small diameter and are secured on the driving shaft of a pivotally mounted driving motor. The friction wheels are held between two coaxially arranged face plates which are connected to the reel carrier shafts. By selectively engaging the friction wheels with one or the other of the face plates, a change of direction of rotation occurs and, due to the differences in diameter between the friction wheels or between the face plates, a speed increase during tape rewind is effected.

Such known magnetic tape recorders have the disadvantage that irregularities in the motor speed, originating from the commutator, or irregularities in gear wheels, are transmitted to the spool or reel carrier shafts, and this leads to slight changes in the tape speed. Additionally, the small diameters of the stepped friction wheels require considerable drive pressure against the face plates, and thus the friction wheels rapidly show signs of wear.

SUMMARY OF THE INVENTION

This invention relates to magnetic tape recorders having friction wheel drives for the carrier shafts for the spools or reels for the magnetic tape, and in which the change of direction of rotation and the speed increase, for the rewind setting, are effected by stepped friction wheels connected, for rotation, with the motor output shaft. More particularly, the present invention is directed to a magnetic tape recorder of this type in which the deficiencies of known tape recorders are minimized and the uniformity of drive of the magnetic tape recorder is greatly improved.

In accordance with the invention, these objectives are obtained by an arrangement of friction wheels acting as flywheels, and which are rotatably mounted on a switchable setting member and are connected by resilient transmission means to the motor output shaft. The flywheel effect of the friction wheels helps to compensate for drive irregularities, while the power transmitting means provides the spacing changes necessary for the adjusting member movements while maintaining the necessary positive and non-positive engagement between the adjusting members. The power transmitting means preferably is a grooved drive of elastic material, such as rubber or plastic composition material. The friction wheels may be fixedly connected to a coaxially located driving disc or pulley, and mounted conjointly therewith on the setting member. The friction wheel and the driving pulley may be integral, and the flywheel effect of the friction wheels can be improved by using a driving pulley of large diameter, or one having a peripheral collar encircling its periphery. To bring about operational engagement of the friction wheels with adjacent driving members, the setting member, in one switching position, causes a friction wheel to abut a counterwheel secured on the carrier shaft for the forward tape motion. The setting member has another switching position determining the tape reverse movement, in which the other friction wheel is frictionally engaged with an intermediate wheel in turn frictionally engaged with a counterwheel mounted on the other spool or reel carrier shaft.

In accordance with a feature of the invention, the setting member may comprise a setting lever which is pivotal against a spring bias by means of a cam wheel. An abutment spring provided between the setting lever and the track of the cam wheel provides an engaging surface and assures a resiliently yielding operating engagement of the setting lever and the cam wheel. For the exact determination of the switching positions of the cam wheel, the latter may be releaseably latched in its positions corresponding to recording and playback, or stop, while it may be brought and retained manually into the position providing rapid tape rewind. The switching movements of the cam disc or wheel preferably may be effected by means of a slider which, for this purpose, is connected by a pin and slot connection to the cam wheel, and is movably guided by means of a wheel rotatably mounted on the slider. The cam wheel movements may be used to switch electric circuits.

A second cam track provided on the cam wheel or disc acts on a lever serving as an actuating member for the motor switch and the amplifier switch, and carrying a brake shoe which, in the stop setting, abuts against the counterwheel on the tape feed carrier shaft and clamps the counterwheel against rotation. The cam wheel can changeover the amplifier from recording to playback and vice versa, though a lever and an electric switching means coupled with the lever, and it also may be used as an adjusting member for an erase head adapted to be brought into operative connection with the magnetic tape. In the recording position, this erase head is pivoted to rest against the magnetic tape, but otherwise is retracted into a non-effective position. This cam wheel, acting as a common switching and actuating member for the mechanism and the electrical components of the apparatus, allows the magnetic tape to be manipulated by means of the switching wheel, or by a single operating element.

An object of the invention is to provide an improved friction wheel drive for magnetic tape recorders.

Another object of the invention is to provide such a friction wheel drive minimizing deficiencies of known magnetic recorders of this type.

A further object of the invention is to provide such a friction wheel drive for magnetic recorders in which the uniformity of drive of the magnetic recorder is improved.

A further object of the invention is to provide such a friction wheel drive in which friction wheels act as flywheels.

For an understanding of the principles of the invention, reference is made to the following description of a typical embodiment thereof as illustrated in the accompanying drawing.

BRIEF DESCRIPTION OF THE DRAWING

In the Drawing:

FIGS. 3, 4 and 5 are partial views, corresponding to FIG. 1, illustrating various positions of the driving mechanism from below; and FIG. 6 is a side elevation view of a cam wheel.

DESCRIPTION OF THE PREFERRED EMBODIMENT

Figure 1:
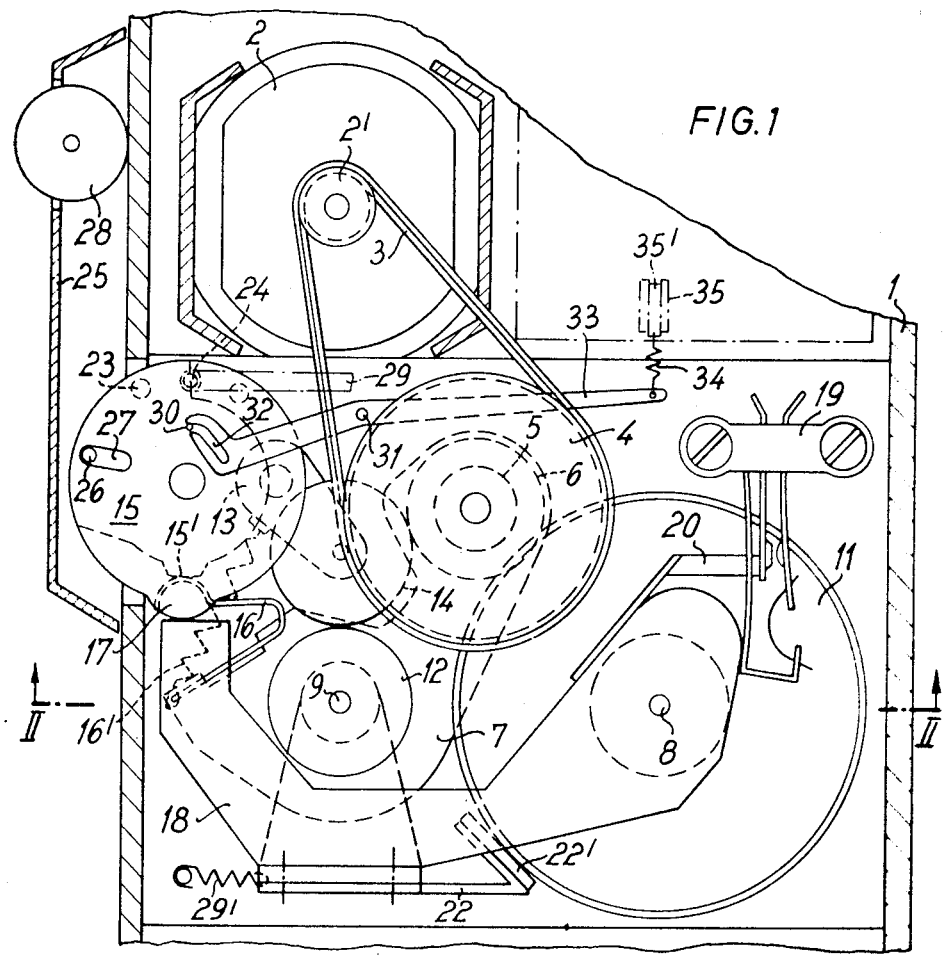
FIG. 1 is a horizontal sectional view through a magnetic tape recorder embodying the invention.
Figure 2:
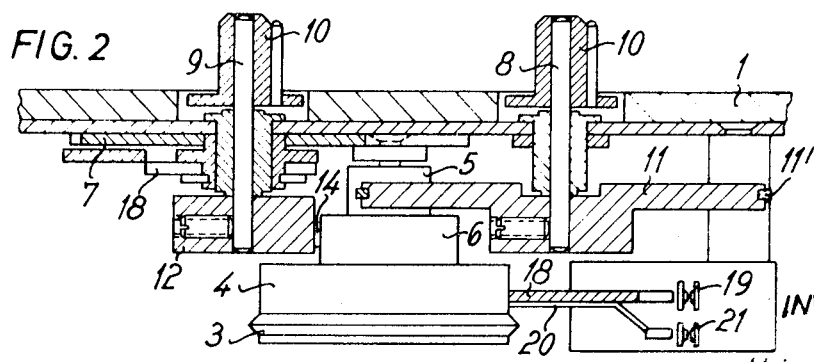
FIG. 2 is a section taken on the line II—II of FIG. 1.

Referring to FIGS. 1 and 2, the housing 1 of a magnetic tape recorder mounts a driving motor 2 for the tape. Motor 2 has an output pulley 2' connected with a belt pulley 4 through a belt drive 3 of elastic material, pulley 4 being molded integrally with friction wheels 5 and 6. The two friction wheels, together with pulley 4, form a flywheel, and the combined unit is rotatably mounted on a pivotal setting lever 7. One of the friction wheels, preferably that having the larger diameter, may also be a belt pulley.

The magnetic recorder includes a spool or reel carrier shaft 8 for feeding of the tape, and a spool or reel carrier shaft 9 for rewinding the tape. The ends of these carrier shafts extend from the apparatus housing 1 and carry coupling heads 10 for the tape spools or reels, which have not been shown. An opposing or counterwheel 11 of large diameter is fixed to rotate with carrier shaft 8, and its circumference carries a tire 11' of a material with a high coefficient of friction. A further counterwheel 12, but of a smaller diameter, is fixed on spool carrier shaft 9, and frictionally engages an intermediate wheel 14 rotatably mounted on a pivoted lever 13.

Setting lever 7 is pivotal about spool carrier shaft 9, so that either friction wheel 5 is engaged with counterwheel 11 or friction wheel 6, through intermediate wheel 14, is engaged with counterwheel 12, depending upon the position of setting lever 7. Movements of setting lever 7 are effected by means of a rotatable cam wheel 15 having cam surfaces 15', 15'', 15''' and 15''''. Setting lever 7 carries a supporting spring 16 engageable with cam wheel 15, and is biased to pivot in one direction by a pre-tensioned spring 16'. An axially offset cam 17 on cam wheel or disc 15 cooperates with an actuating lever 18 which is also pivotal about carrier shaft 9 and acts both on a switch 19 in the circuit of the amplifier, which latter has not been shown, and through a first extension 20 on a switch 21 in the energizing circuit of driving motor 2. Lever 18 carries a second extension 22 with a friction lining 22' which acts as a brake shoe for counterwheel 11.

Cam wheel 15 is adapted to be releasably latched in various switching positions by recesses 23 cooperating with a housing-mounted detent ball 24, and may be rotated by means of a slider 25 through the medium of a pin 26 on slider 25 engaged in an elongated slot 27 in cam wheel 15, so that longitudinal displacement of slider 25 angularly displaces cam wheel or disc 15. Slider 25 rotatably carries a switching wheel 28 whose peripheral surface engages apparatus housing 1 and effects movement of slider 25 by rolling along the surface of housing 1. Switching wheel 28 may have a smooth periphery or may be provided with cross-grooves or knurls. Cam wheel 15 is also in controlling relation with an erase head which has not been shown and, for this purpose, it is connected with the erase head through a linkage 29 or through a gear arrangement.

Cam wheel 15 also pivots a double lever 33 which is pivotally mounted, intermediate its ends, at 31 on housing 1. For this purpose, one arm of double lever 33 is formed with a gate groove 32 engaging a pin 30 mounted on cam wheel 15. The other arm of lever 33 is connected by a spring 34 with the movable contact 35' of a slider switch 35. Switch 35 switches the amplifier to "recording" or "playback" in dependence upon the angular position of cam wheel or disc 15.

For an understanding of the operation of the apparatus, let it be assumed that the driving elements occupy the "stop" position shown in FIG. 1. In this position, actuating lever 18 opens switch 21 in the motor circuit and switch 19 in the amplifier circuit. Setting lever 7 is supported, through abutment spring 16, against the radial projection 15' of cam wheel 15 and, by swinging downwardly counterclockwise, keeps friction wheel 5 disengaged from counterwheel 11. At the same time, friction lining 22' acts as a friction brake against counterwheel 11, so as to immobilize the spool or reel carrier shaft 8. Slider switch 35 has switched the amplifier to "playback", and pin 30 is positioned in front of the opening of gate groove 32 of lever 33.

When wheel 28, comprising the sole actuating member of the magnetic tape recorder, is moved manually in a direction toward the upper edge of the drawing sheet, then, through slider 25, cam wheel 15 is turned into the "record" position shown in FIG. 3. In this position, stop spring 16 slides on cam surface 15'' of cam wheel or disc 15 and, under the bias of spring 16', setting lever 7 is swung clockwise until friction wheel 5 engages counterwheel 11. During rotation of cam wheel 15, cam 17 simultaneously releases actuating lever 18, which is now biased by spring 29' to close switches 19 and 21 for the motor and amplifier circuits, respectively. Driving motor 2 rotates groove pulley 4 and, through friction wheel 5, a torque is exerted on wheel 11 so that carrier shaft 8 is rotated.

In the position of the components shown in FIG. 3, cam wheel 15, through linkage 29, has brought the erase head, which has not been shown, into operative engagement with the magnetic tape and, by inserting pin 30 into gate groove 32 of lever 33, cam wheel 15 has brought double lever 33 into the illustrated position so as to act, through spring 34, on contact 35' to switch the amplifier over to recording. While the apparatus is in the position of FIG. 3, recordings may be made with the tape in operation. If the recording is to be interrupted or terminated, this is accomplished simply by returning switch wheel 28 into the position of FIG. 1. Cam wheel 15 is thus reversed and, by opening the motor and amplifier circuits, the driving mechanism also assumes the positions shown in FIG. 1.

To reproduce recordings, switching wheel 28 is rotated counterclockwise to rotate cam wheel 15, to slider 25, into the playback position of FIG. 4. In this position, the motor circuit and the amplifier circuit are again closed, and friction wheel 5 is again brought into frictional engagement with counterwheel 11 through setting lever 7 now supported on cam surface 15''' through spring 16 so that, as in the recording position shown in FIG. 3, reel or spool carrier shaft 8 is rotated. However, the linkage 29 for the erase head remains in a position holding the erase head spaced from the tape, while pin 30, by moving out of gate groove 32, releases double lever 33 which, conjointly with contact 35', is moved back into the position of FIG. 1 and thereby switches the amplifier over to "playback". In the position of the parts shown in FIG. 4, in the same manner as in the position of the parts shown in FIG. 3, friction lining 22', acting as a brake shoe, is lifted off counterwheel 11 so that the latter may rotate without obstruction. By turning switching wheel 28 back into the position of FIG. 1, playback may be interrupted or terminated.

If a rapid reverse movement or rewinding of the tape is required, cam wheel 15 is rotated into the position of FIG. 5 by further rotation of switching wheel 28 in the counter-clockwise direction, so as to move the switching wheel 28 toward the lower edge of the drawing, from the position shown in FIG. 1. In this case, cam surface 15'''' engages spring 16 of setting lever 7, so that lever 7 is swung counterclockwise to cause friction wheel 6, through intermediate wheel 14, to rotate counterwheel 12 of spool or reel carrier shaft 9. The ratios of wheels 6, 14 and 12 are chosen so that a particularly fast reverse drive of the tape can be effected. In the reverse or "rewind" position, friction lining 22' is lifted off wheel 11, so that the tape can be rewound without obstruction. Linkage 29 and double lever 33 remain unaffected, so that the erase head assumes a position remote from the tape and the amplifier is switched to "playback". By turning switch wheel 28 into the position of FIG. 1, the rewinding of the tape is interrupted and the operating positions or settings "recording", "playback", or "stop" can be selected.

FIG. 6 illustrates that cam wheel 15 can be formed of cam wheel components firmly joined to each other. However, it is also possible for cam wheel 15 to be molded integrally, or cams 15' – 15'''', as well as cam 17, may be mutually interchanged by adapting the actuating lever and the setting lever.

While a specific embodiment of the invention has been shown and described in detail to illustrate the application of the principles of the invention, it will be understood that the invention may be embodied otherwise without departing from such principles.

WHAT IS CLAIMED IS:

1. In a magnetic tape recorder having carrier shafts for the tape reels and a driving motor having a drive shaft, and having stop, record, playback and rewind settings, an improved friction wheel drive comprising, in combination, stepped friction wheels operable to effect a change in the direction of rotation of said carrier shafts and a speed increase in the rewind setting of said recorder, said friction wheels acting as flywheels; a switchable setting member rotatably mounting said friction wheels; resilient power transmission means connecting said stepped friction wheels to said drive shaft; said setting member being pivotally mounted; a rotatable cam wheel operable to pivot said setting member; a spring biasing said setting member into engagement with said cam wheel; a housing for said magnetic tape recorder; a slider mounted for longitudinal displacement on said housing; and a pin and slot connection interconnecting said slider and said cam wheel for rotation of said cam wheel responsive to longitudinal displacement of said slider.

2. In a magnetic tape recorder, an improved friction wheel drive, as claimed in claim 1, including a wheel rotatably mounted in said slider and having frictional rolling engagement along a wall of said housing to effect movement of said slider.

3. In a magnetic tape recorder having carrier shafts for the tape reels and a driving motor having a drive shaft, and having stop, record, playback and rewind settings, an improved friction wheel drive comprising, in combination, stepped friction wheels operable to effect a change in the direction of rotation of said carrier shafts and a speed increase in the rewind setting of said recorder, said friction wheels acting as flywheels; a switchable setting member rotatably mounting said friction wheels; resilient power transmission means connecting said stepped friction wheels to said drive shaft; said setting member being pivotally mounted; a rotatable cam wheel operable to pivot said setting member; a spring biasing said setting member into engagement with said cam wheel; switch means operable to switch the amplifier between recording and playback; a lever drive operated by said cam wheel and operating said switching means; and linkage connected to said cam wheel and operating as an adjusting member for an erase head included in said magnetic tape recorder and cooperable with a magnetic tape.

* * * * *